(12) United States Patent  
Wu et al.

(10) Patent No.: US 11,477,385 B2  
(45) Date of Patent: Oct. 18, 2022

(54) ELECTRONIC DEVICE WITH ROTATABLE CAMERA FOR PROTECTING PRIVACY

(71) Applicant: ASUSTeK COMPUTER INC., Taipei (TW)

(72) Inventors: I-Hsi Wu, Taipei (TW); Jen-Pang Hsu, Taipei (TW); Chean-Teng Wong, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 201 days.

(21) Appl. No.: 16/871,095

(22) Filed: May 11, 2020

(65) Prior Publication Data

US 2020/0366849 A1    Nov. 19, 2020

Related U.S. Application Data

(60) Provisional application No. 62/848,074, filed on May 15, 2019.

(30) Foreign Application Priority Data

Jan. 13, 2020  (TW) .................................. 109101104

(51) Int. Cl.
*H04N 5/232* (2006.01)
*G06V 40/16* (2022.01)
(Continued)

(52) U.S. Cl.
CPC ....... *H04N 5/23296* (2013.01); *G06V 40/168* (2022.01); *H04N 5/23245* (2013.01);
(Continued)

(58) Field of Classification Search
CPC ........... H04N 5/23296; H04N 5/23245; H04N 21/41407; H04N 21/42202; H04N 21/4223; G06V 40/168
See application file for complete search history.

(56) References Cited

U.S. PATENT DOCUMENTS 6,933,981 B1   8/2005 Kishida et al.
7,627,342 B2  12/2009 Kang
(Continued)

FOREIGN PATENT DOCUMENTS

CN   1633136 A   6/2005
CN   1979322 A   6/2007
(Continued)

*Primary Examiner* — John Villecco
(74) *Attorney, Agent, or Firm* — McClure, Qualey & Rodack, LLP

(57) ABSTRACT

An electronic device is provided, which includes a body, a camera module, at least one sensor, and a processor. The camera module is rotatably disposed on the body. The sensor is disposed in the electronic device for generating an environmental sensing signal. The processor is electrically connected to the camera module and the sensor. The processor loads and executes an application to perform: generating a display image; controlling the camera module to capture a face image and combining the face image and the display image into a live stream image when a show face function of the application is activated; and when the electronic device is in the live stream mode and the processor determines that an environment dynamic change occurs according to the environmental sensing signal, the processor transmits a notification signal to the application to notify the application to close the show face function.

5 Claims, 4 Drawing Sheets

(51) Int. Cl.
*H04N 21/414* (2011.01)
*H04N 21/4223* (2011.01)
*H04N 21/422* (2011.01)

(52) U.S. Cl.
CPC ... *H04N 21/41407* (2013.01); *H04N 21/4223* (2013.01); *H04N 21/42202* (2013.01)

(56) References Cited

U.S. PATENT DOCUMENTS

| | | | |
|---|---|---|---|
| 7,672,118 B2 | 3/2010 | Yamazato et al. | |
| 7,782,375 B2 | 8/2010 | Chambers et al. | |
| 8,010,154 B2 | 8/2011 | Chambers et al. | |
| 9,795,871 B2* | 10/2017 | Trombetta | A63F 13/00 |
| 10,200,768 B2* | 2/2019 | Niemeyer | H04N 21/6379 |
| 10,291,847 B2 | 5/2019 | Chin et al. | |
| 10,561,932 B2* | 2/2020 | Trombetta | A63F 13/655 |
| 10,915,163 B2 | 2/2021 | Tzou et al. | |
| 2003/0220145 A1 | 11/2003 | Erickson et al. | |
| 2005/0024500 A1 | 2/2005 | Katayama | |
| 2005/0110874 A1 | 5/2005 | Song | |
| 2005/0270385 A1 | 12/2005 | Shioya et al. | |
| 2007/0132835 A1 | 6/2007 | Kang | |
| 2012/0008011 A1* | 1/2012 | Garcia Manchado | H04N 5/23293 348/231.2 |
| 2012/0120186 A1* | 5/2012 | Diaz | H04N 5/2258 348/E13.001 |
| 2014/0232905 A1* | 8/2014 | Jung | H04N 5/232933 348/239 |
| 2014/0320604 A1 | 10/2014 | Dalvi et al. | |
| 2014/0354779 A1 | 12/2014 | Cho et al. | |
| 2015/0189175 A1 | 7/2015 | Fan et al. | |
| 2015/0290540 A1* | 10/2015 | Trombetta | A63F 13/79 463/31 |
| 2015/0370226 A1 | 12/2015 | Kim et al. | |
| 2016/0360256 A1* | 12/2016 | Van Os | H04N 5/765 |
| 2017/0163879 A1 | 6/2017 | Tsuji et al. | |
| 2018/0093174 A1* | 4/2018 | Trombetta | A63F 13/00 |
| 2018/0288499 A1* | 10/2018 | Niemeyer | H04N 21/42203 |
| 2019/0147175 A1* | 5/2019 | Varerkar | G06V 20/20 726/26 |
| 2019/0313146 A1* | 10/2019 | Kakuschke | G06T 11/60 |
| 2020/0366772 A1* | 11/2020 | Wu | H04M 1/0264 |
| 2020/0366784 A1* | 11/2020 | Wu | H04M 1/72454 |
| 2021/0385412 A1* | 12/2021 | Matula | G06V 20/40 |
| 2022/0036708 A1* | 2/2022 | Rey | H04L 65/403 |

FOREIGN PATENT DOCUMENTS

| | | | |
|---|---|---|---|
| CN | 101634871 A | 1/2010 | |
| CN | 102170493 A | 8/2011 | |
| CN | 102572031 B | 12/2014 | |
| CN | 104255015 A | 12/2014 | |
| CN | 104469165 A | 3/2015 | |
| CN | 204425471 U | 6/2015 | |
| CN | 104954675 A | 9/2015 | |
| CN | 105827847 A | 8/2016 | |
| CN | 105955779 A | 9/2016 | |
| CN | 107333055 A | 11/2017 | |
| CN | 107509038 A | 12/2017 | |
| CN | 107671862 A | 2/2018 | |
| CN | 104954676 B | 3/2018 | |
| CN | 107819907 A | 3/2018 | |
| CN | 107872582 A | 4/2018 | |
| CN | 207530941 U | 6/2018 | |
| CN | 104301609 B | 9/2018 | |
| CN | 108495039 A | 9/2018 | |
| CN | 108509782 A | 9/2018 | |
| CN | 108566510 A | 9/2018 | |
| CN | 108683795 A | 10/2018 | |
| CN | 108989660 A | 12/2018 | |
| CN | 109167894 A | 1/2019 | |
| CN | 109388925 A | 2/2019 | |
| CN | 103873652 B | 3/2019 | |
| CN | 109639965 A | 4/2019 | |
| EP | 3514760 A1 * | 7/2019 | G06F 21/602 |
| KR | 102154432 B1 * | 9/2020 | |
| TW | M417729 U1 | 12/2011 | |
| TW | M436853 U1 | 9/2012 | |
| TW | 201631954 A | 9/2016 | |
| TW | 201702808 A | 1/2017 | |

* cited by examiner

ELECTRONIC DEVICE WITH ROTATABLE CAMERA FOR PROTECTING PRIVACY

CROSS-REFERENCE TO RELATED APPLICATION

This application claims the priority benefit of Taiwan application serial No. 109101104 filed on Jan. 13, 2020, and US provisional application Ser. No. 62/848,074, filed on May 15, 2019. The entirety of the above-mentioned patent application is hereby incorporated by reference herein and made a part of specification.

BACKGROUND OF THE INVENTION

Field of the Invention

The invention relates to an electronic device and, more particularly, to an environmental sensing system and display control method of an electronic device.

Description of the Related Art

Users might utilize live stream services on a mobile phone with a flipped camera lens for work or play games. However, if the mobile phone is dropped or the camera lens is flipped accidentally while live streaming, the camera might capture images of the environment and the privacy would leak out through the live stream service.

BRIEF SUMMARY OF THE INVENTION

The disclosure in an embodiments is to provide an electronic device, which can automatically close the display image when the operation environment changes.

According to an aspect, an electronic device is provided. The electronic device includes: a body; a camera module, rotatably disposed on the body; a sensor, disposed in the electronic device for generating an environmental sensing signal; and a processor, electrically connected to the camera module and the sensor, and configured to load and execute an application with the following steps: generating a display image; controlling the camera module to capture a face image and combining the face image with the display image to form a live stream image when a show face function of the application is activated; and when the electronic device is in a live stream mode and the processor determines that an environment dynamic change occurs according to the environmental sensing signal, the processor transmits a notification signal to the application to notify the application to close the show face function.

In summary, the electronic device and the control method provided in the embodiments prevents private pictures from being leaked while the mobile phone is operated over live streaming and the camera lens flips in response to the environment changes. The sensor detects the environmental changes around the electronic device to control the output streaming screen and related accessories, protecting the privacy of users.

These and other features, aspects and advantages of the present invention will become better understood with regard to the following description, appended claims, and accompanying drawings.

DETAILED DESCRIPTION OF THE EMBODIMENTS

Figure 1A:
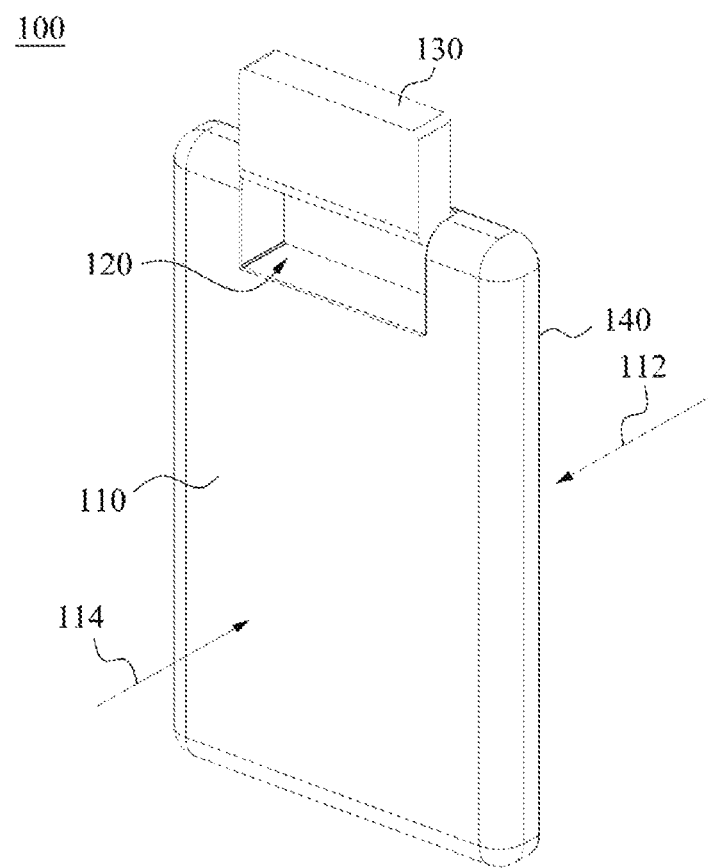
FIG. 1A is a schematic diagram of an electronic device according to some embodiments.

Various embodiments will be disclosed below with reference to the drawings. For the sake of clarity, many practical details will be described in the following description. It should be understood, however, that these practical details should not be used to limit the invention. That is, in some embodiments, these practical details are unnecessary. In addition, in order to simplify the drawings, some well-known and conventional structures and elements will be shown in a simple and schematic manner in the drawings.

Refer to FIG. 1A. FIG. 1A is a schematic diagram of an electronic device 100. In an embodiment, the electronic device 100 is a mobile phone, a tablet, a personal computer, a laptop, or other devices. The electronic device 100 is a smart phone to facilitate applications such as making phone calls and live streaming in the embodiment.

Figure 1B:
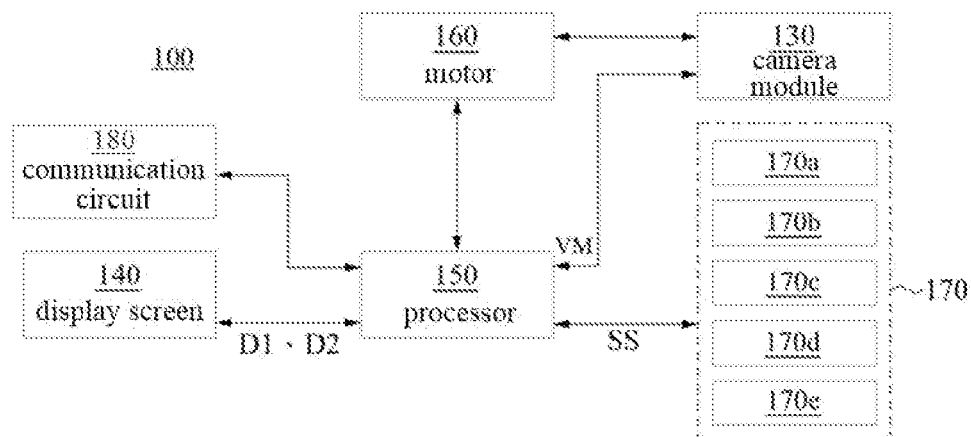
FIG. 1B is a block diagram of an electronic device according to some embodiments.

Refer to FIG. 1A and FIG. 1B. The electronic device 100 includes a body 110, a camera module 130, a display screen 140, a processor 150, a motor 160, at least one a sensor 170, and a communication circuit 180. In an embodiment, the sensor 170 is disposed on the electronic device 150, and the sensor 170 generates environmental sensing signal SS by detecting state or change of the environment.

In an embodiment, when the electronic device 100 is in the live stream mode, the processor 150 determines whether an environment dynamic change occurs according to the environmental sensing signal SS generated by the sensor 170, and selectively turns on or off specific functions (such as a show face function in the application). The detail about the detection of the environment dynamic change and to on/off of the show face function will be fully explained in subsequent embodiments.

The processor 150 is electrically connected to the camera module 130, the display screen 140, the motor 160, and the orientation sensing elements 170a and 170b. The motor 160 is electrically connected to the camera module 130 to drive the camera module 130 to flip relative to the body 110.

In the embodiment in FIG. 1B, the sensor 170 on the electronic device 100 includes two orientation sensing elements 170a and 170b. The two orientation sensing elements 170a and 170b are disposed on the body 110 and the camera module 130, respectively. The orientation sensing element 170a disposed on the body 110 senses the orientation of the body 110 to generate the orientation information. The orientation sensing element 170b disposed on the camera module 130 senses the orientation of the camera module 130 to generate another the orientation information. The orientation information generated by the two the orientation sensing elements 170a and 170b is used as the environmental sensing signal SS.

In some embodiments, the processor 150 is a central processing unit (CPU), an application-specific integrated circuit (ASIC), multiple processors, a distributed processing system, or a suitable processing circuit. In one embodiment, the display screen 140 is a touch screen.

In some embodiments, each of the orientation sensing elements 170a and 170b in the sensor 170 includes at least one of a gyroscope or a gravity sensor. In an embodiment, the gyroscope detects the current angular velocities of the body 110 and the camera module 130 as the orientation information, or the gravity sensor detects the current gravity of the body 110 or the current gravity of the camera module 130 as the orientation information. In this way, the processor 150 determines an angle between the camera module 130 and the body 110 based on the angular velocities detected by the gyroscopes. The processor 150 also determines whether the electronic device 100 is now flat or upright, or the angle between the camera module 130 and the body 110 based on the gravity value detected by the gravity sensor. In some embodiments, the electronic device 100 further includes circuit elements such as a display card (not shown) or an audiovisual processing circuit (not shown). The above circuit components provide processed image data to the display screen 140 display based on the control of the processor 150.

Figures 2A, 2B:
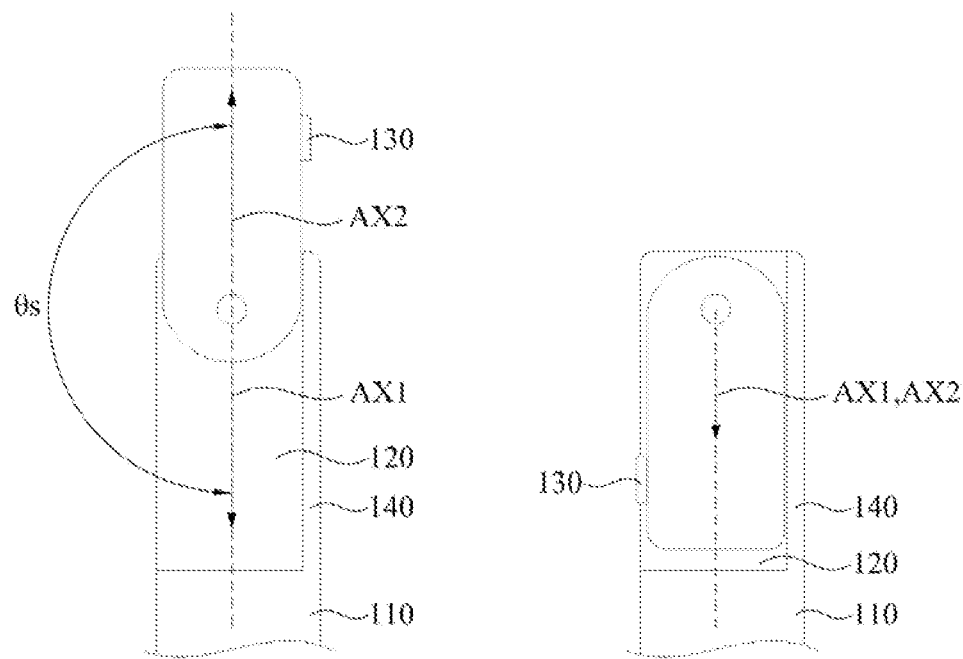
FIG. 2A to FIG. 2C are schematic diagrams of an camera module of an electronic device flipping relative to a body to different flip angles in some embodiments.
Figure 2C:
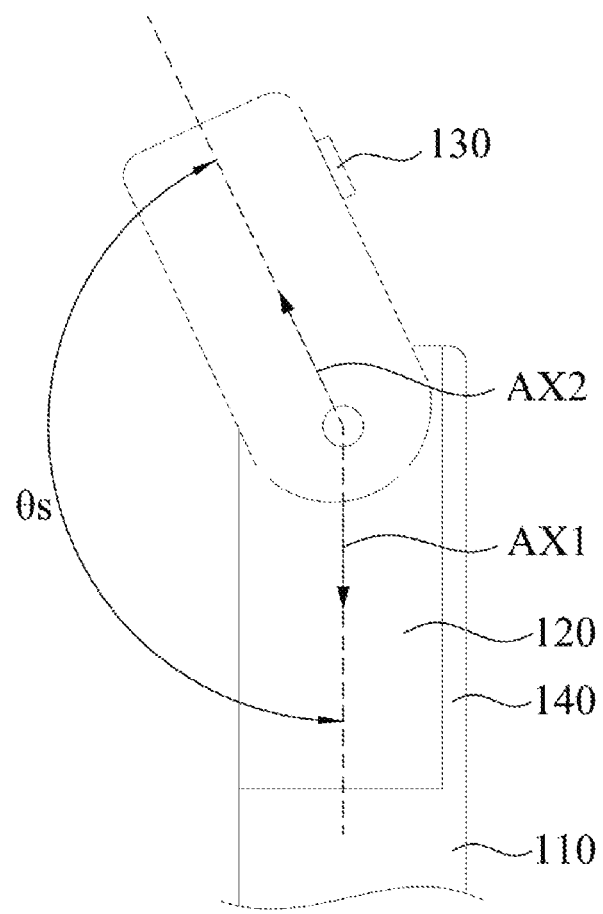

Please refer to FIG. 2A to FIG. 2C. FIG. 2A to FIG. 2C are schematic diagrams of an camera module 130 of an electronic device 100 flipping relative to a body to different flip angles in some embodiments. Since the camera module 130 is rotated relative to the body 110, the extension axis AX1 of the camera module 130 forms different angles with the extension axis AX2 of the body 110 when the camera module 130 is rotated to different positions, as shown in FIG. 2A and FIG. 2C.

In one embodiment, as shown in FIG. 2A, when the electronic device 100 is in a front lens mode (for example: the electronic device 100 is performing live video streaming), the camera module 130 is flipped to the top position (a first position) as shown in FIG. 2A. At this time, the extension axis AX2 of the camera module 130 is opposite to the extension axis AX1 of the display screen 140, and the angle θs between the extension axes AX1 and AX2 is 180 degrees, and the lens direction of the camera module 130 is completely toward the front of the body (that is, the camera module 130 and the display screen 140 face the same direction).

In one embodiment, as shown in FIG. 2B, when the electronic device 100 is in a rear lens mode (for example: the user operates the electronic device 100 to capture or record the surrounding scenes), the camera module 130 is flipped to the bottom and returns to the accommodating space 120, as shown in FIG. 2B (a second position), the angle between the extension axis AX2 of the camera module 130 and the extension axis AX1 of the body 110 is 0 degrees. At this time, the lens direction of the camera module 130 is completely toward the rear of the body (the lens direction opposite to the direction faced by the display screen 140).

Please refer to FIG. 2C. In this embodiment, the electronic device 100 is in the front lens mode, and the camera module 130 is flipped back to a position where the angle θs between the body module 110 and the body 110 is approximately 130 degrees by an external force. At this time, the position of the camera module 130 is largely deviated from a standard position of the front lens mode (that is, the first position where the angle is 180 degrees). When the electronic device 100 detects the change of the angle θs between the body module 110 and the body 110 reaches 50 degrees because the camera module 130 is flipped from the front lens mode by the external force, the avatar image VM currently captured by the camera module 130 does not meet the expected image data (for example: the user is not in the image data). At this time, the processor 150 determines that the camera module 130 is flipped by the external force according to the environmental sensing signal SS (that is, the orientation information generated by the orientation sensing elements 170a and 170b, respectively), and further determines that the environment dynamic change occurs at this time.

Figure 3:
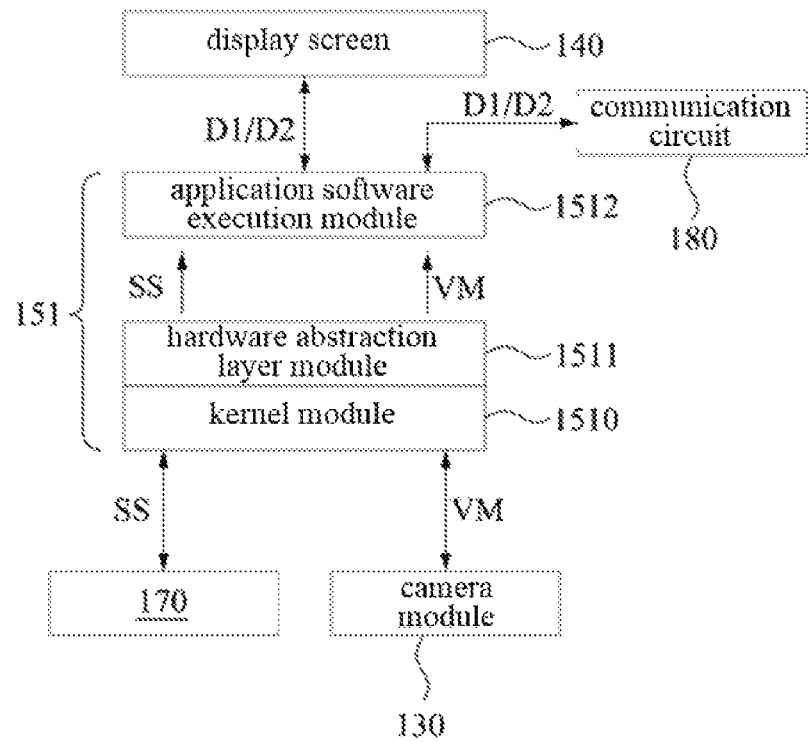
FIG. 3 is a schematic diagram of an internal architecture of an operating system 151 executed by a processor according to some embodiments.

FIG. 3 is a schematic diagram of an internal architecture of an operating system 151 executed by a processor 150 according to some embodiments. The operating system 151 includes a kernel module 1510, a hardware abstraction layer module (HAL module) 1511, and an application software execution module 1512.

In an embodiment, the operating system 151 is an Android system. In this embodiment, the kernel module 1510 is the execution core layer of the Android system, the hardware abstraction layer module 1511 is the hardware abstraction layer of the Android system, and the application software execution module 1512 is the application software layer of the Android system.

In another embodiment, the kernel module 1510, the hardware abstraction layer module 1511 and the application software execution module 1512 are implemented by the processor 150, a processing circuit, or an application-specific integrated circuit (ASIC).

When the user runs an application on the electronic device and performs a live stream, the processor 150 loads and executes the application in the application software execution module 1512 of the operating system 151. In one embodiment, the application is the game application, and the live stream is a game live stream. The processor 150 executes the game content of the application to generate the live stream image (which includes the face image and the game screen) accordingly.

Figures 4A, 4B:
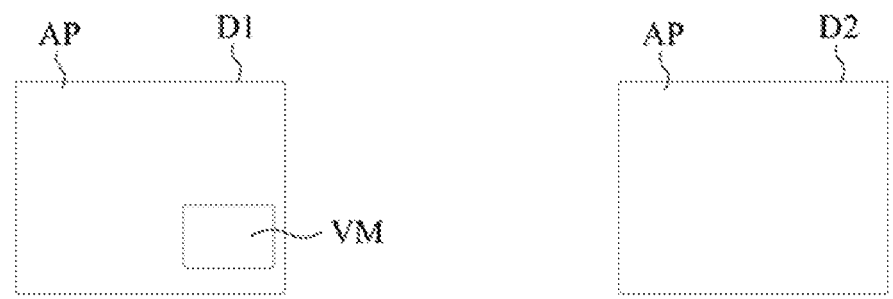
FIG. 4A and FIG. 4B are schematic diagrams of game live stream images in different situations, respectively.

Please refer to FIG. 4A and FIG. 4B. FIG. 4A and FIG. 4B are schematic diagrams of live stream images D1 and D2 in different situations, respectively. As shown in FIG. 4A, when the processor 150 loads and executes the game application, a display image AP is generated. In one embodiment, the display image AP is a game screen, and the display image AP includes a virtual character in the game application, an operation interface of the game application, a story dialogue of the game application, and the like.

When the a show face function of the application is activated, the processor 150 controls the camera module 130 to capture a face image VM of the current user, and combines the face image VM and the display image AP into a live stream image D1. In one embodiment, the kernel module 1510 receives the face image VM from the camera module 130, the hardware abstraction layer module 1511 receives the face image VM from the kernel module 1510, and the application software execution module 1512 receives the face image VM from the hardware abstraction layer module 1511. The application software execution module 1512 combines the display image AP generated by the application and the face image VM to generate the live stream image D1. In one embodiment, the live stream image D1 is a game live stream image.

At this time, the application software execution module 1512 of the processor 150 displays the live stream image D1 on the display screen 140, or transmits it to an external server (not shown) through the communication circuit 180 coupled to the processor 150. In this way, the near-end viewer can see the live stream image D1 through the display screen 140, and the far-end viewer can see the live stream image D1 through the external server.

In the embodiment shown in FIG. 4A, the display image AP is an execution screen of a game application played by a user (for example, a game live stream host) performing on the electronic device 100. Meanwhile, in the embodiment shown in FIG. 4A, the face image VM is a user image captured by the camera module 130 in a selfie mode. In this case, viewers watching the live stream image D1 can see the game screen and the face image when the user is playing the game, so that the actions and expressions of the user (such as the game live streamer) playing the game on the electronic device 100 can be known.

When the electronic device 100 is in the live stream mode, the processor 150 determines whether an environment dynamic change occurs according to an environmental sensing signal SS generated by the sensor 170. In an embodiment, the kernel module 1510 receives the environmental sensing signal SS from the sensor 170, the hardware abstraction layer module 1511 receives the environmental sensing signal SS and the face image VM from the kernel module 1510, and the application software execution module 1512 receives the environmental sensing signal SS and the face image VM from the hardware abstraction layer module 1511. The application software execution module 1512 detects whether the environment dynamic change occurs according to the environmental sensing signal SS.

In an embodiment, when the electronic device 100 is in the live stream mode and the processor 150 determines that the environment dynamic change occurs according to the environmental sensing signal SS, the processor 150 transmits a notification signal to the application, notify the application to close the show face function. In detail, when the electronic device 100 is in the live stream mode and the application software execution module 1512 in the operating system 151 executed by the processor 150 detects that the environment dynamic change occurred (for example: the camera module 130 is pulled by an external force to change the angle between the camera module 130 and the body 110) according to the environmental sensing signal SS, the application software execution module 1512 notifies the application to close the show face function. At this time, the application software execution module 1512 uses the display image AP generated by the application alone to generate the live stream image D2, and the live stream image D2 is displayed on the display screen 140 (as shown in FIG. 4B) or transmitted to the external server (not shown) via the communication circuit 180. As a result, the near-end viewer can see the live stream image D2 through the display screen 140, and the live streaming platform viewers can see the live stream image D2 through the external server.

The live stream image D2 shown in FIG. 4B includes the display image AP generated by the application, but not include the face image VM captured by the camera module 130. That is, when the environment dynamic change (for example, the external force triggers the camera module 130 to deviate from the preset position of the camera module 130) occurs, the live stream image D2 is no longer display the face image of the current user (such as the game live streamer), to prevent the user's privacy image from being transmitted accidentally.

In addition, when the application software execution module 1512 of the processor 150 determines that the environment dynamic change occurs according to the environmental sensing signal SS, the processor 150 notifies the camera module 130 to stop capturing the face image VM, and controls the camera module 130 to flip to the bottom to return the camera module 130 to the accommodation space 120, as shown in FIG. 2B (the second position), which prevents the camera module 130 from being damaged due to the environment dynamic change.

In another embodiment, the sensor 170 for sensing the environment dynamic change is not limited to the two the orientation sensing elements 170a and 170b in the above embodiment.

In another embodiment, at least one of the sensor 170 includes an optical sensor 170c, as shown in FIG. 1B, and the environmental sensing signal includes an optical sensing reading detected by the optical sensor 170c. The optical sensor 170c is coupled to the processor 150 and transmits the optical sensing reading to the processor 150. The application software execution module 1512 detects whether the environment dynamic change occurs based on the received optical sensing reading. For example, when the electronic device 100 performs a game live stream (as shown in FIG. 4A, when the show face function is enabled, the output of the live stream image D1 includes the face image VM and the display image AP), the optical sensing reading detected by the optical sensor 170c is in a certain value range. When the optical sensing reading changes suddenly and significantly, it represents that the electronic device 100 slips or is flipped to a different orientation, and the environment dynamic change is detected at this time. When detecting the environment dynamic change, the application software execution module 1512 of the processor 150 notifies the game application to disable the show face function. At this time, the live stream image D2 does not contain the face image VM. In addition, in some embodiments, the processor 150 also notifies the camera module 130 to stop capturing the face image VM, and controls the camera module 130 to flip to the bottom.

In another embodiment, at least one of the sensor 170 further includes a proximity sensor (P sensor) 170d, as shown in FIG. 1B, and the environmental sensing signal includes a proximity sensing reading detected by the proximity sensor 170d. The proximity sensing reading represents the distance between the proximity sensor 170d and the closest plane in front. The proximity sensor 170d is coupled to the processor 150 and transmits the proximity sensing reading to the processor 150. When the environment dynamic change occurs (for example, the electronic device 100 slides, hits certain objects, changes position in space, etc.), the proximity sensing reading usually changes significantly. The application software execution module 1512 determines whether the environment dynamic change has occurred based on the proximity sensing reading received from the hardware abstraction layer module 1511. When determining the environment dynamic change occurs, the application software execution module 1512 of the processor 150 notifies the game application disables the show face function. In addition, in some embodiments, the processor 150 also notifies the camera module 130 to stop capturing the face image VM, and controls the camera module 130 to flip to the bottom.

In another embodiment, at least one of the sensor 170 may further include a hall sensor (hall sensor) 170e, as shown in FIG. 1B, the environmental sensing signal includes a hall sensing reading detected by the hall sensor 170e. The hall sensing reading represents the distribution of the magnetic field around the hall sensor 170e. The hall sensor 170e is coupled to the processor 150 and transmits the hall sensing reading to the processor 150. The application software execution module 1512 determines whether the environment dynamic change has occurred based on the hall sensing reading received from the hardware abstraction layer module. When determining the environment dynamic change, the application software execution module 1512 of the processor 150 notifies the game application disables the show face function. In addition, in some embodiments, the processor 150 also notifies the camera module 130 to stop capturing the face image VM and controls the camera module 130 to flip to the bottom.

It should be particularly noted that at least one of the sensor 170 of the electronic device 100 in the embodiments includes one or the combination of the orientation sensing elements 170a and 170b, the optical sensor 170c, the proximity sensor 170d, and the hall sensor 170e in the above embodiments. In an embodiment, the electronic device 100 only include one kind of the sensor 170 to sense the environment dynamic change. In an embodiment, the electronic device 100 includes multiple sensors and receives multiple sensing information to comprehensively evaluate whether the environment dynamic change occurs. When two or more of the multiple sensors detect the environment dynamic change occurs, the game application is notified to disable the show face function, thus prevents the sensor from being overly sensitive and causing false detections.

In summary, the electronic device and the control method provided in the embodiments prevents other privacy pictures from being leaked when a user uses a mobile phone for operations or live streams and the camera lens is flipped due to the mobile phone being dropped or affected by the environment. The sensor detects the environmental changes around the electronic device and processes them at the hardware abstraction layer in the processor to control the output streaming screen and related accessories to protect user privacy.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An electronic device, comprising:
   a body;
   a camera module, rotatably disposed on the body;
   a sensor, disposed in the electronic device for generating an environmental sensing signal, wherein the sensor comprises a plurality of orientation sensing elements, and the environmental sensing signal includes orientation information; and
   a processor, electrically connected to the camera module and the sensor, the processor loads and executes an application to perform the following steps:
   generating a display image;
   controlling the camera module to capture a face image and combining the face image with the display image to form a live stream image when a show face function of the application is activated;
   determining an angle between the camera module and the body according to the orientation information, and determining whether the camera module is flipped by an external force according to the angle to cause an environment dynamic change; and
   when the electronic device is in a live stream mode and the processor determines that the environment dynamic change occurs, the processor transmits a notification signal to the application to notify the application to close the show face function.

2. The electronic device according claim 1, when the show face function is activated, the processor is configured to combine the face image and the display image into the live stream image.

3. The electronic device according claim 1, when determining that the environment dynamic change occurs, the processor is configured to disable the show face function, and only use the display image to generate the live stream image alone.

4. The electronic device according claim 1, further comprising a display screen, the display screen is electrically connected with the processor and configured to:
   when the show face function is activated, display the live stream image generated by combining the face image and the display image;
   when the show face function is disabled, display the live stream image generated by the display image alone.

5. The electronic device according claim 1, further comprising a communication circuit, the communication circuit is coupled to the processor and configured to:
   when the show face function is activated, transmit the live stream image generated by combining the face image and the display image to an external server,
   when the application disables the show face function, transmit the live stream image generated by the display image alone to the external server.

* * * * *